United States Patent Office 2,821,537
Patented Jan. 28, 1958

2,821,537

CATALYTIC HYDROGENATION OF CARBON MONOXIDE WITH ADDITION OF AMMONIA OR METHYLAMINE

Walter Rottig, Oberhausen-Sterkrade-Nord, Germany, assignor to Ruhrchemie Aktiengesellschaft, Oberhausen-Holten, Germany, and Lurgi Gesellschaft fuer Waermetechnik m. b. H., Frankfurt am Main-Heddernheim, Germany, a German corporation No Drawing. Application July 15, 1952
Serial No. 299,000

Claims priority, application Germany July 21, 1951

8 Claims. (Cl. 260—449.6)

This invention relates to improvements in the catalytic hydrogenation of carbon monoxide. More particularly, it relates to a process for the catalytic hydrogenation of carbon monoxide with the production of primary synthesis products which have a relatively high content of oxygen-containing compounds and preferably alcohols in addition to a high content of nitrogen-containing compounds and olefins.

Processes for effecting the catalytic hydrogenation of carbon monoxide with the addition of ammonia to the hydrogen-containing snythesis gas are known. These processes have been effected at both atmospheric and elevated pressures. A certain amount of nitrogen-containing compounds consisting chiefly of primary amines, are present in the synthesis products obtained when using these processes. Alcohols and other oxygen-containing compounds, however, are only formed in very small amounts.

One object of this invention is the catalytic hydrogenation of carbon monoxide with the production of primary synthesis products containing nitrogen-containing compounds in addition to a relatively high content of oxygen-containing compounds and preferably alcohols. This, and still further objects will become apparent from the following description:

It has now been found that with the use of special catalysts and synthesis gas containing small quantities of gaseous alkaline reacting compounds, primary products may be obtained with a high content of oxygen-containing compounds, olefins, and nitrogen-containing compounds.

The hydrogenation is effected at pressures of about 1 to 100 atmospheres, and preferably at pressures of 5 to 40 atmospheres with synthesis gases which contain about 0.5 to approximately 6 parts by volume of hydrogen for each part by volume of carbon monoxide and small quantities, preferably 0.5 to 2% of alkaline-reacting compounds gaseous under synthesis conditions and preferably ammonia or derivatives thereof, such as for instance methyl amine. The synthesis is effected at temperatures of about 170 to 300° C. and preferably at temperatures of 190 to 260° C.

The catalysts used in accordance with the invention are precipitated iron catalysts which are free from or contain relatively small quantities of carrier materials. Kieselguhr and activated bleaching earth have proven particularly good as carrier material of this kind. Not more than 25% by weight, and preferably less than 10% by weight of carrier material should be present in relation to the iron in the catalyst. The catalyst must be reduced in accordance with the invention to a free iron content of more than 60 and preferably more than 80% of the total iron content. Reduction is effected with reduction gases such as, for example, carbon monoxide and/or hydrogen. The catalyst may be activated, if necessary or desired, with copper, silver, or metals of the second to seventh group of the periodic system. From these metals, the metals of group II of the periodic classification, but also the metals titanium, vanadium, cerium, thorium and manganese have successfully been used.

The catalyst must be prepared by precipitation from an aqueous solution under alkaline conditions at preferably a pH of about 8 to 10. The precipitated catalyst must have a content of alkali oxide of between 1 and 15% and preferably between 5 and 10% calculated as $K_2O$ and based on the iron present. The final alkali oxide content may be obtained by totally washing the precipitated catalyst and thereafter impregnating the catalyst with alkali oxide or by partially washing the precipitated catalyst to the alkali oxide content desired. Also a combination of these two expedients is possible.

If an increased yield of esters rather than alcohols is desired, in accordance with the invention, the catalyst should be impregnated either partially or exclusively with salts of non-volatile acids, such as, for example, alkali phosphates, borates, and tungstates. Also in this case, the alkali is added in quantities of between 1 and 15%, calculated as $K_2O$. If alcohols preferably are desired, the alkali may be introduced into the catalyst in the form of a salt of a volatile acid, of an acid which decomposes during the reduction, or in the form of the hydroxide.

It has been found that the life and activity of the iron catalyst used in accordance with the invention may be increased if they are dried prior to reduction at a temperature of 80° to 150° C., and preferably 110° C. to a residual water content of 4 to 7% by weight of $H_2O$.

Catalysts reduced from suitable oxygen-containing compounds with reducing gases at linear gas velocities of at least 30 to 50 cm. per second, preferably 100 to 200 cm. per second, measured in the cold state (0° C.; 760 mm. Hg), and temperatures of approximately 200° to 400° C. were found to be particularly active. For this reduction, the use of reduction gases rich in carbon monoxide has been found particularly favorable under certain circumstances. The reduction may be effected even with pure carbon monoxide. In general, a carbon monoxide to hydrogen proportion by volume of 1:1 to 1:2 is satisfactory. The use of carbon monoxide or gases containing carbon monoxide during the reduction is of advantage especially in cases where a high reduction value along with lowest possible reduction temperatures is desirable.

If the catalysts have a copper content of more than 15% and preferably between 15 and 50%, a particularly high formation of oxygen-containing products will be effected, and the synthesis may be carried out at relatively low temperatures.

This result is also obtained by using catalysts having a grain size which is below 2 mm., in diameter and preferably between 0.5 and 1.5 mm. in diameter and as uniform as possible. With respect to the uniformity a tolerance of approximately 0.3 mm. is allowed. With the use of these catalysts, it has been found particularly advantageous under certain circumstances to effect the synthesis with synthesis gases which are conducted from below through the catalyst layer. This expedient has proven particularly good where high gas loads of, for example, more than 300 volumes of gas per volume of catalyst per hour are used in the synthesis, since a lowering of the pressure loss is possible in this way.

In the past it has only very rarely been possible to precipitate catalysts from sulfate solutions. However, in accordance with the invention, the catalyst may be precipitated from sulfate solutions with approximately 10 to 50% and preferably approximately 25 to 30% of the iron present being converted into the trivalent form. The washing of the precipitated mass obtained should be carried out with the use of ion exchanging compounds and preferably the use of easily soluble ammonia compounds. The washing, predrying and drying must be expediently effected with the abundant admittance of air in order to obtain a further oxidation of the bivalent iron still present to convert the same into the trivalent form. In any case, more than 70% and preferably more than 80% of the total iron in the catalyst should be present in the trivalent form before the reduction. It is of advantage to increase the concentration of the ion exchanging compounds in the washing water during the washing in order to obtain a maximum washing with small quantities of water. In general, washing waters are preferably used with a content of ion exchanging compounds of 0.2 to 20% and preferably of 0.2 to 2%. The individual steps to be taken for the precipitation of the catalysts from sulfate solutions are the same as stated in patent application Serial No. 280,173, filed April 2, 1952, now Patent No. 2,786,817.

The synthesis itself should be effected in a manner which assures careful treatment of the catalyst, with straight gas passage and preferably with recycling of the synthesis gas, using 1 to 10 parts and preferably 3 to 5 parts by volume of recycled gas for each part by volume of fresh synthesis gas.

The gas load should generally be about 10–1,000 volumes of fresh gas per volume of catalyst per hour, preferably 100–500 volumes.

The use of a temperature gradient, i. e., an increasing catalyst temperature in the direction of gas flow, is of advantage in special cases. This is true, for example, if in a synthesis carried out with once-through operation or with only little gas recycling, as, for example, 1 volume of fresh gas+0.5 volume of recycle gas, the concentration between the inlet and the outlet of the reactor becomes considerably lower so that an increased temperature at the reactor outlet as compared with that at the reactor inlet is favorable for increasing the rate of conversion at the reactor outlet.

It is possible to effect the synthesis in accordance with the invention, using a fixed catalyst bed, a liquid phase synthesis or a fluidized process. When working with the fluidized bed process, the synthesis is effected in a gaseous phase with a finely distributed catalyst layer, particles of which are eddying in a lively whirling motion, thus forming a fluidized bed.

The carbon monoxide hydrogenation products obtained in accordance with the invention, have a content of more than 20% oxygen-containing compounds in addition to more than 10% of amines and a high content of olefins.

The following examples are given to illustrate the invention and not to limit the same:

*Example 1*

A catalyst was precipitated from a boiling solution containing 40 gms. of iron and 12 gms. of copper per liter by pouring the solution into a boiling soda solution containing 101 gms. of soda per liter. The pH was 9.2. The filtered catalyst mass was freed from excess alkali by repeated washing with condensate and then impregnated with potassium carbonate in such a manner that 8 parts by weight of potassium carbonate calculated as $K_2O$ for 100 parts by weight of iron were present. The grain size of the dried and molded mass was between 1 and 3 mm.

The reduction was carried out at a temperature of 320° C. with the use of a gas mixture consisting of 75% of hydrogen and 25% of nitrogen at a linear gas velocity of 1.4 meters per second. The reduction time was 120 minutes. The reduction value was 65% of metallic iron.

When water gas containing 2% of $NH_3$ was passed over this catalyst at a pressure of 30 atmospheres, and a gas load of 100 liters of gas per liter of catalyst per hour, a conversion rate of 56% of $CO+H_2$ was obtained at a temperature of 183° C.

The processing of the synthesis product obtained yielded 35% of oxygen-containing compounds consisting chiefly of primary aliphatic alcohols, in addition to 17% of nitrogen-containing compounds consisting chiefly of primary aliphatic amines. The olefinic portion in the remaining hydrocarbons was 60% in the gasoline boiling range and 50% in the diesel oil boiling range.

When the same catalyst was charged with twice the gas quantity, a $CO+H_2$ conversion of 50% could be obtained at a temperature of 196° C.

When charging the catalyst with three times the gas quantity, a $CO+H_2$ conversion of 55% was obtained at a temperature of 210° C.

The yield of nitrogen-containing and oxygen-containing products was slightly reduced under these conditions.

*Example 2*

An aqueous solution of iron nitrate and copper nitrate of the concentration as mentioned in Example 1 was poured into a boiling soda solution containing 100 gms. of $Na_2CO_3$ per liter. After filtration, the precipitated catalyst slurry was partially washed with hot condensate so that finally 8 parts of alkali calculated as $K_2O$ and based on 100 parts of iron remaining in the catalyst. The mass was molded, dried at a tempearture of 105° C., and sieved to a grain size of between 1.5 and 3 mm.

The reduction was carried out for 90 minutes at a temperature of 310° C. with hydrogen at a linear gas velocity of 1.5 m. per second, measured in the cold state. The reduction value was 70% of metallic iron.

Water gas containing 2% of $NH_3$ was passed over the catalyst at a pressure of 30 atmospheres, a temperature of 190° C. and a gas load of 100 liters of gas per liter of catalyst per hour. The $CO+H_2$ conversion was 60%.

Working up the synthesis product yielded 39% of oxygen-containing compounds, chiefly primary aliphatic alcohols, in addition to 15% of nitrogen-containing compounds consisting chiefly of primary amines.

*Example 3*

A catalyst was prepared in the manner described in Example 1. The ratio of iron to copper was 100 to 10. The reduction value was 80% of metallic iron. The impregnation was effected with the use of primary potassium phosphate in such a manner that 8 parts of potassium phosphate calculated as $K_2O$ for every 100 parts of Fe were present in the catalyst. Under the reduction and synthesis conditions of Example 1, a $CO+H_2$ conversion of 53% was obtained at a gas load of 100 liters of gas per liter of catalyst per hour. The proportion of nitrogen-containing compounds and preferably of primary aliphatic amines, was 12% in addition to 30% of oxygen-containing compounds consisting chiefly of aliphatic alcohols.

*Example 4*

A solution consisting of iron sulfate and copper sulfate and containing 5 parts of copper for every 100 parts of iron and having a concentration of 40 parts of iron for every 1000 parts of water was heated until it boiled and precipitated in the hot state by pouring it into a soda solution of 80° C. containing 90 gms. of $Na_2CO_3$ per liter. During the precipitation, an air stream was blown through the precipitation apparatus. The quantity of air was 600 liters for every 25 gms. of iron, the blowing time being 3.5 minutes. Immediately thereafter, the precipitate was freed from the mother liquor by subjecting it to a suction filtration and was then washed two times with a quantity of boiling condensate corresponding to twelve times the quantity of iron present. Finally, the catalyst mass was washed three times by suspending it in an ammonium carbonate solution containing 5 to 10 gms. of ammonium carbonate dissolved in 1500 cc. of solution. 1500 cc. of washing solution for every 25 gms. of iron were used in each of the three washings. After the last washing, the sulfur content in the finished catalyst was only 0.02%.

28% of the total Fe were now present as Fe(III), the balance being Fe(II). Then the catalyst mass was impregnated in a potassium carbonate solution in such a manner that 8 parts of alkali calculated as $K_2O$ for every 100 parts of iron were contained in the mass.

The catalyst mass was dried for 24 hours at a temperature of 110° C. with circulating air and crushed to a grain size of 2-4 mm. The content of Fe(III) was now 88%. Thereafter, the catalyst was reduced for 1 hour at a temperature of 300° C., using a gas mixture consisting of 75% of hydrogen and 25% of nitrogen at a linear gas velocity of 1.4 meters per second, measured in the cold state. Thereafter, the reduction value of the catalyst was 68% of free iron.

A gas consisting of 35 parts of CO, 55 parts of $H_2$, 2% of ammonia, the balance being carbon dioxide, nitrogen and methane, was passed over this catalyst at a gas load of 100 liters of gas per liter of catalyst per hour, a synthesis pressure of 30 atmospheres and a synthesis temperature of 192° C. A $CO+H_2$ conversion of 65% was obtained. The resulting product was worked up yielding 33% of oxygen-containing compounds consisting chiefly of primary aliphatic compounds, in addition to 13% of nitrogen-containing compounds consisting chiefly of primary amines.

I claim:

1. In a process for the catalytic hydrogenation of carbon monoxide, the improvement which comprises intimately contacting under conditions of temperature between 170 and 300° C. and at conditions of pressure between about 1 and 100 atmospheres, a carbon monoxide hydrogenation synthesis gas containing 0.5 to 6 parts by volume of hydrogen per each part by volume of carbon monoxide and 0.5 to 2% by volume of a member selected from the group consisting of ammonia and methylamine with a precipitated iron catalyst which has been reduced to a free iron content of more than 60% and containing 0 to 25% of a carrier material and about 1 to 15% alkali oxide calculated as $K_2O$ and based on the iron present, and recovering the carbon monoxide hydrogenation product with more than 20% oxygen containing compounds, more than 10% amines and with a high content of olefins.

2. Improvement according to claim 1, in which said contacting is effected at a pressure of about 10 to 30 atmospheres.

3. Improvement according to claim 1, in which said catalyst has an alkali oxide content of about 5 to 10% calculated as $K_2O$.

4. Improvement according to claim 1, in which said catalyst is impregnated with a salt of a non-volatile acid in order to obtain said alkali content.

5. Improvement according to claim 4, in which said salt is a non-volatile acid selected from the group consisting of alkali phosphates, alkali borates and alkali tungstates.

6. Improvement according to claim 1, in which said catalyst has a copper content in excess of 15%.

7. Improvement according to claim 1, in which said catalyst has a substantially uniform grain size below 2 mm. in diameter.

8. Improvement according to claim 1, in which said catalyst is a catalyst precipitated from a sulfate solution with about 10 to 50% of the iron present converted into the trivalent form, washed with ion exchanging solutions, predried and dried, said washing, predrying and drying being effected with a further oxidation of the residual bivalent iron to more than a 70% trivalent iron content.

References Cited in the file of this patent

UNITED STATES PATENTS

| | | |
|---|---|---|
| 2,133,267 | Ayers | Oct. 18, 1938 |
| 2,374,454 | Oliver et al. | Apr. 24, 1945 |
| 2,422,631 | Olin et al. | June 17, 1947 |
| 2,438,584 | Stewart | Mar. 30, 1948 |
| 2,449,071 | Hawk et al. | Sept. 14, 1948 |
| 2,483,512 | Voorhies et al. | Oct. 1, 1949 |
| 2,518,754 | Clark | Aug. 15, 1950 |
| 2,560,970 | Martin | July 17, 1951 |
| 2,727,056 | Gross et al. | Dec. 13, 1955 |

FOREIGN PATENTS

| | | |
|---|---|---|
| 672,405 | Great Britain | May 21, 1952 |